United States Patent Office 3,230,939
Patented Jan. 25, 1966

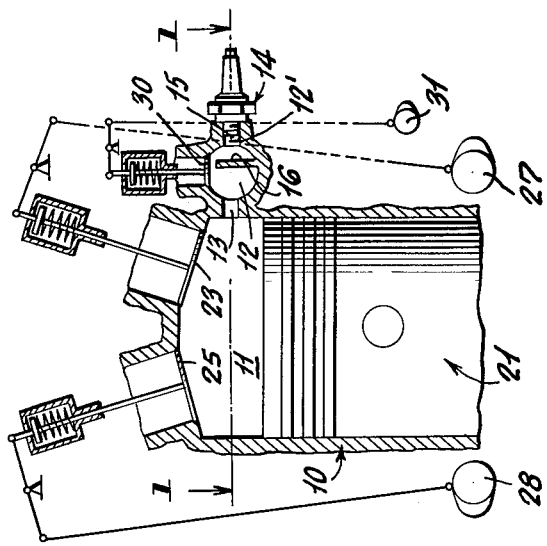
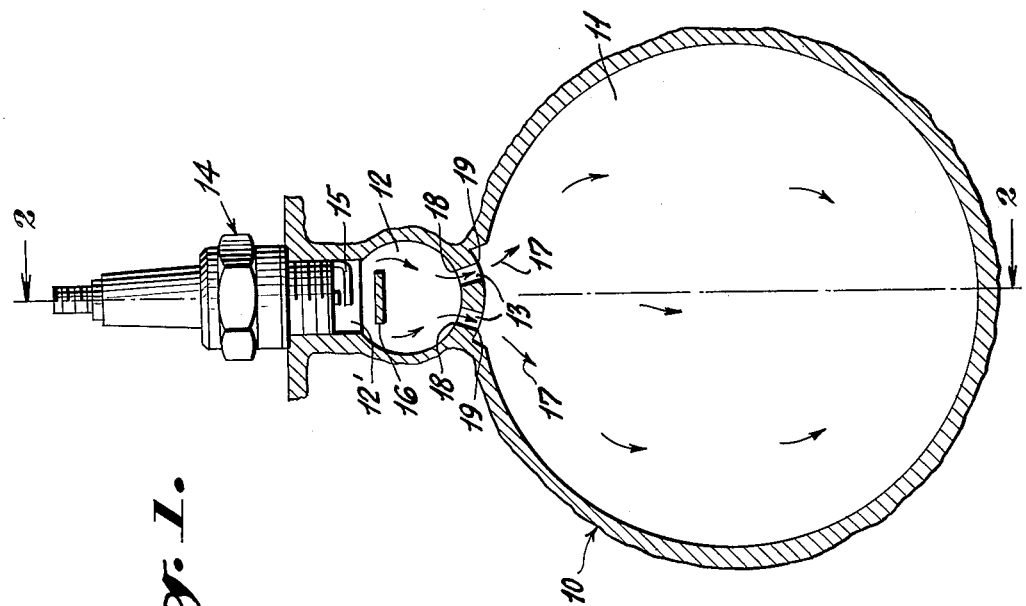

3,230,939
METHOD OF PRECHAMBER-TORCH IGNITION IN INTERNAL COMBUSTION ENGINES
Lev Abramovich Goossak, 57 Leninsky Prospect, Apt. 86, Moscow, U.S.S.R.
Filed Feb. 4, 1963, Ser. No. 256,062
4 Claims. (Cl. 123—32)

This invention relates to internal combustion engines, and more particularly to a structure providing prechamber torch ignition of the mixture in the main combustion chamber of the internal engine, and this application is a continuation-in-part of my co-pending application, Serial No. 7,956, filed December 8, 1959, now abandoned.

The use of a flame or torch for igniting the mixture in the main combustion chamber of an internal combustion engine has been known for many years, and prior to arriving at the present invention a detailed study was made of the history of development of this type of ignition, and throughout this development, it was apparent that it was considered necessary to provide as complete combustion as possible in the prechamber in order to provide a torch having the highest possible temperature. In the beginning, ignition of the mixture in the prechamber was provided by a gas burner, since reliable methods of electrical ignition were not available at that time, and the development of this type of ignition progressed concurrently with the development of electrical ignition systems and components until such time as reliable electrical ignition means were available, at which time such electrical ignition means was utilized for igniting the mixture in the prechamber. Of course, the performance of an internal combustion engine utilizing the prechamber torch method of combustion was compared with the performance of conventional internal combustion engines utilizing electrical ignition of the fuel mixture in the main combustion chamber, and despite the fact that electrical methods of ignition reached a relatively high degree of perfection, it was obvious that internal combustion engines utilizing electrical ignition of the fuel mixture in the main combustion chamber left much to be desired, and it appeared that the use of prechamber torch ignition might well result in an improvement in the operational characteristics of internal combustion engines.

While the operation of internal combustion engines utilizing prechamber torch ignition materially improved with the development and perfection of electrical ignition means which could be utilized for igniting the charge in the prechamber of the engine, nevertheless, the results achieved were not sufficient to warrant the substitution of prechamber torch ignition methods for the conventional electrical ignition methods, and consequently in spite of the obvious disadvantages of electrical ignition methods, engines utilizing this method of ignition are still the only commonly used engines, with the exception, of course, of diesel type engines.

From the above facts, it might appear that in spite of the apparent advantages of the prechamber torch method of ignition, that such method was inherently incapable of providing the results sought, but upon a re-examination of the history of the development of this type of ignition it became apparent that throughout such development it was considered that it was necessary to obtain substantially complete combustion of the prechamber mixture, and to provide a torch of the highest possible flame temperature. This condition was comparatively easy to obtain in that all that was necessary was to provide a prechamber auxiliary mixture with an air excess coefficient of approximately 0.9 to 1.0, and such a mixture assured a reliable spark-ignition thereof, together with a rapid and complete combustion, and the provision of a torch having a comparatively high flame temperature. Since this concept had apparently reached the highest possible point of development, it appeared that possibly such a concept was incorrect, and that it might be possible to improve the operating characteristics of this type of ignition by radically changing the operating characteristics of the prechamber. Consequently, investigation of the problem along these lines was initiated with the result that the present invention was evolved therefrom, and provided a structure for prechamber torch ignition which resulted in materially improved operating characteristics of the internal combustion engine when compared to such engines utilizing conventional spark-ignition of the fuel mixture in the main combustion chamber.

As a result of these investigations, it was found that a material improvement in the operating characteristics of the internal combustion engine could be obtained by utilizing a prechamber torch of ignition in which an excessively rich, comparatively slow burning auxiliary fuel mixture was introduced into the prechamber with such auxiliary mixture having an air-excess coefficient of approximately 0.4 to 0.7, with the result that such auxiliary mixture was relatively slow burning, and only provided incomplete combustion of the auxiliary mixture. Such an incomplete combustion of the prechamber mixture results in the formation of CO, $H_2$ as well as aldehydes, a substantial concentration of peroxides and other active products of intermediate oxidation as well as highly chemical active atoms and free radicals. This results in providing a flame torch of comparatively low temperature and the presence in this torch of the chemically active products of incomplete combustion initiates and speeds up the development of chemical chain reactions in the fuel mixture in the main combustion chamber. This method of prechamber torch ignition results in an increase in the speed of ignition of the fuel mixture in the main combustion chamber of three to four times as compared with conventional spark ignition. This method also results in a saving of fuel of approximately fifteen (15) to twenty (20) percent, as compared to conventional electrical ignition engines.

It has been found in practicing this invention that it is necessary to utilize an excessively rich, comparatively slow-burning fuel mixture in the prechamber, to maintain turbulence in the prechamber at a minimum during combustion of the prechamber mixture, to provide a prechamber having a volume approximately two to three percent of the volume of the main chamber, to provide ports between the prechamber and the main chamber having a cross-sectional area to the prechamber-volume ratio of approximately 0.03 to 0.04 $cm.^2/cm.^3$, and to provide sharp inner and outer edges on the ports to promote turbulence of the torch and resulting turbulence of the fuel mixture in the main combustion chamber.

It is accordingly an object of the invention to provide a structure for prechamber torch ignition in an internal combustion engine which will result in substantially instantaneous complete combustion of the fuel mixture in the main chamber of the engine.

A further object of the invention is the provision of a structure for prechamber torch ignition in an internal combustion engine in which conventional spark-ignition for the mixture in the prechamber is utilized.

A still further object of the invention is the provision of a structure for prechamber torch ignition in an internal combustion engine in which an excessively rich, comparatively slow burning auxiliary fuel mixture is utilized in the prechamber, and in which the stream of gases flowing from the prechamber into the main chamber of the engine contain products of combustion as well as highly chemically active incomplete products of combustion, which results in initiating rapid chain reactions in the mixture in the main chamber, thereby providing substantially instantaneous complete combustion in the main chamber.

Further objects and advantages of the invention will be apparent from the following description taken in conjunction with the accompanying drawings, wherein:

FIG. 1 is a transverse sectional view taken substantially on the line 1—1 of FIG. 2 and showing an internal combustion engine constructed in accordance with this invention; and FIG. 2 a diagrammatic vertical sectional view taken substantially on the line 2—2 of FIG. 1 and showing a four-stroke type overhead valve internal combustion engine incorporating with the prechamber torch ignition structure shown in FIG. 1.

With continued reference to the drawings, and particularly FIG. 1, there is shown in section a portion of an internal combustion engine having a cylinder 10 which provides a main combustion chamber 11, and attached to the cylinder 10 is a prechamber 12 having a recess 12' and communicating with the main chamber 11 through ports 13. There is also provided a conventional spark plug 14 having electrodes 15 disposed in the recess 12' of the prechamber 12, and between the electrodes 15 and the ports 13 there is provided a baffle 16 which substantially obdurates the recess 12' from the ports 13.

As will be seen from an inspection of FIG. 1, the volume of the prechamber 12 is relatively small with respect to the volume of the main chamber 11, and it has been found that the volume of the prechamber 12 should be approximately two to three percent of the volume of the main chamber 11. It has also been found that the ratio of the cross-sectional area of the ports 13 to the volume of the prechamber 12 should be approximately 0.03 to 0.04 cm.$^2$/cm.$^3$, and that the ratio of the length of the ports 13 to the diameter thereof should be approximately 1.0 to 1.5.

The prechamber 12 may be supplied with an auxiliary fuel mixture from any suitable source, and such auxiliary fuel mixture should be adequate to fill the prechamber and scavenge any unburned gases therefrom, the volume of this auxiliary fuel mixture being approximately 1.5 to 4.0 times the volume of the prechamber. The composition of the auxiliary mixture in the prechamber at the moment of ignition should be excessively rich, and with an air excess coefficient of approximately 0.4 to 0.7, this mixture resulting in providing a shortage of oxygen when compared to that required for complete combustion of approximately thirty (30) to sixty (60) percent.

The expression "air excess coefficient" as used herein represents the relation of the quantity of air actually present in a given fuel and air mixture to the quantity of air theoretically required for complete combustion of the fuel contained in this mixture, and may be expressed as:

$$\alpha = \frac{Ga}{Gat}$$

where
$Ga$=the quantity of air in the mixture, and
$Gat$=the theoretical quantity of air for complete combustion.

Further, the quantity of air theoretically required for complete combustion of the fuel in the mixture equals the amount of fuel in the mixture multiplied by the quantity of air theoretically required for complete combustion of one unit of fuel measured by volume or by weight.

As an example, since it requires approximately 15 kg. of air for complete combustion of 1 kg. of liquid hydrocarbon fuel, it follows that:

$$Lt = 15 \frac{\text{kg. of air}}{\text{kg. of fuel}}$$

where
$Lt$=one unit of air

Consequently, the air excess coefficient may be expressed as:

$$\alpha = \frac{Ga}{GfLt}$$

where
$Ga$=quantity of air in the mixture
$Gf$=quantity of fuel in mixture
$Lt$=one unit of air by volume or weight The auxiliary mixture and prechamber walls should be preheated in any suitable manner, and in order to maintain turbulence in the prechamber at a minimum, the baffle 16 is provided between the electrodes 15 of the spark plug 14 and the ports 13, and consequently upon ignition by the spark plug 14 the mixture in the prechamber 12 burns comparatively slowly and incompletely, resulting in the flow of gases through the ports 13 to the main chamber 11, thereby providing a torch indicated by the arrows 17 formed by products of combustion, and also chemically active incomplete products of combustion. The inlet edges 18 of the cylindrical ports 13 and the outlet edges 19 thereof are sharp in order to promote turbulence in the gases flowing through the ports 13 with resultant turbulence in the mixture in the main chamber 11, and it has been found that this results in rapid dispersion of the incomplete chemically active products of combustion throughout the mixture in the main chamber 11, thereby providing for substantially instantaneous complete combustion in such main chamber. The use of this invention has resulted in very materially improved performance characteristics of the internal combustion engine.

The above description of this invention as applied to the structure diagrammatically shown in FIG. 1 represents the basic structure and manner of operation which may be applied to various types of internal combustion engines, and the following constitutes a specific description of this invention utilized in conjunction with one specific type of internal combustion engine.

With specific reference to FIG. 2, there is diagrammatically shown in section a portion of a four-stroke overhead valve type internal combustion engine having a cylinder 10 and a piston 21 therein providing a main combustion chamber 11. An intake valve 23 serves to admit a fuel mixture to the main chamber 11 from a suitable carburetor, not shown, and an exhaust valve 25 provides for discharge of products of combustion from the main chamber 11. The intake valve 23 and the exhaust valve 25 may be operated by suitable cams, 27 and 28, respectively.

A prechamber 12 may be mounted on the cylinder 10, and communicates with the main chamber 22 through ports 13, and an inlet valve 30 operated by a suitable cam 31 serves to control admission of an auxiliary mixture from a suitable source to the prechamber 12.

The prechamber 12 is provided with a recess 12' disposed opposite the ports 13 and disposed in the recess 12' are the electrodes 15 of a suitable ignition device in the form of a sparkplug 14. A baffle 16 is provided between the recess 12' and the ports 13 and this baffle serves to substantially obdurate the recess 12' from the ports 13 and maintain turbulence in the prechamber 12 at a minimum.

During the suction stroke the auxiliary mixture inlet valve 30 opens at approximately the same time as the intake valve 23 to the main combustion chamber 11, and the flow of the auxiliary mixture into the prechamber 12 serves to scavenge the same and provide a fresh, excessively rich mixture therein. Upon completion of the scavenging of prechamber 12 and charging the same with an excessively rich auxiliary mixture, and with the charging of the main combustion chamber 11 with a normal mixture, the valve 23 and 30 closed, the compression stroke commences and the piston 21 moves upwardly in the cylinder 10 to compress the mixture in the main combustion chamber 11, and due to such compression, a small portion of such mixture flows into the prechamber 12 and compresses the mixture therein. At the completion of the compression stroke and at the moment of spark ignition of the auxiliary mixture in the prechamber 12, such auxiliary mixture should have an air-excess coefficient of approximately 0.4 to 0.7, and as a result of such mixture, ignition thereof will result in slow burning and incomplete combustion, and such a condition is further enhanced by the lack of turbulence in the prechamber 12 provided for by the baffle 16 in the manner described above.

As the result of slow and incomplete combustion of the excessively rich, auxiliary mixture in the prechamber 12, there will be provided a stream of products of combustion and chemically active products of incomplete combustion flowing from the prechamber 12 into the main combustion chamber 11, at which time combustion of the mixture in the main combustion chamber 11 will commence, and at the same time, due to the sharp edges of the ports and to the speed of movement of the stream of gases flowing from the prechamber 12 through the ports to the main combustion chamber 11, high turbulence will be created in the main combustion chamber 11, resulting in substantially instantaneous complete combustion of the mixture therein, thereby forcing the piston 21 downwardly in the power stroke. The rapid combustion of the fuel mixture in the main combustion chamber 11 is materially enhanced by the rapid development of chain reactions throughout the main fuel mixture, and this results in a combustion process which develops three to four times more rapidly than in an internal combustion engine utilizing conventional electrical ignition.

At the completion of the power stroke the exhaust valve 25 opens, as a result of which upward movement of the piston 21 during the exhaust stroke will force the products of combustion from the main combustion chamber 11. The cycle of operation is thereafter repeated.

There has been shown in the drawing and described in detail above a structure providing prechamber torch ignition applied to internal combustion engines, and there has also been described the complete cycle of operation in connection with a four-stroke type of engine. It will be seen from the above that internal combustion engines have been provided which results in a material increase in the desirable operating characteristics of such engines when compared to conventional engines utilizing electrical ignition, and as is evident from above, the invention may be conveniently utilized in connection with all engines of this type, with the exception of diesel engines.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. An internal combustion engine including a main combustion chamber, a prechamber having a recess, the volume of said main chamber being several times the volume of said prechamber, ports providing communication between said main chamber and said prechamber, an ignition device disposed in said recess in said prechamber, a baffle disposed between said ignition device and said ports, said recess being substantially obdurated from said ports by said baffle, means for introducing an excessively rich comparatively slow-burning fuel mixture into said prechamber and means for introducing a normal fuel mixture into said main chamber, whereby upon ignition of said rich fuel mixture incomplete combustion thereof will occur in said prechamber and products of combustion and chemically active products of incomplete combustion will be discharged through said ports into said main chamber to ignite the mixture therein and promote substantially instantaneous complete combustion in said main chamber.

2. An internal combustion engine as defined in claim 1, in which the volume of said prechamber is approximately two to three percent of the volume of said main chamber.

3. An internal combustion engine as defined in claim 1, in which the ratio of the cross-sectional area of said ports to the volume of said prechamber is approximately 0.03 to 0.04 cm.$^2$/cm.$^3$ and the ratio of the length of said ports to the diameter thereof is approximately 1.0 to 1.5.

4. An internal combustion engine as defined in claim 1, in which the inlet and outlet edges of said ports are sharp in order to promote turbulence in the stream of products of combustion and chemically active products of incomplete combustion flowing through said ports from said prechamber into said main chamber.

References Cited by the Examiner
UNITED STATES PATENTS

| | | | |
|---|---|---|---|
| 2,121,920 | 6/1938 | Mallory | 123—32 |
| 2,156,665 | 5/1939 | Mallory | 123—32 |
| 2,422,610 | 6/1947 | Bagnulo | 123—32 |
| 2,435,659 | 2/1948 | Summers | 123—32 |
| 2,690,741 | 10/1954 | Broderson | 123—32 |
| 2,758,576 | 8/1956 | Schlamann | 123—32 |
| 2,849,992 | 9/1958 | Stillebroer et al. | 123—32 |
| 2,924,210 | 2/1960 | Summers | 123—32 |

SAMUEL LEVINE, *Primary Examiner.*

RICHARD B. WILKINSON, *Examiner.*